(12) United States Patent
Ni et al.

(10) Patent No.: US 10,529,065 B2
(45) Date of Patent: Jan. 7, 2020

(54) METHOD OF EVALUATING THE QUALITY OF IMAGES

(71) Applicant: GORILLA TECHNOLOGY INC., Taipei (TW)

(72) Inventors: Sze-Yao Ni, Taipei (TW); Yuang-Tzong Lan, Taipei (TW); Kuo-Chen Wu, Taipei (TW)

(73) Assignee: GORILLA TECHNOLOGY INC., Taipei (TW)

( * ) Notice: Subject to any disclaimer, the term of this patent is extended or adjusted under 35 U.S.C. 154(b) by 101 days.

(21) Appl. No.: 15/880,558

(22) Filed: Jan. 26, 2018

(65) Prior Publication Data

US 2019/0114760 A1 Apr. 18, 2019

(30) Foreign Application Priority Data

Oct. 18, 2017 (TW) .............................. 106135635 A (51) Int. Cl.
*G06K 9/00* (2006.01)
*G06T 7/00* (2017.01)
*G06T 7/73* (2017.01)
*G06K 9/32* (2006.01)

(52) U.S. Cl.
CPC ........ *G06T 7/0002* (2013.01); *G06K 9/00228* (2013.01); *G06K 9/00255* (2013.01); *G06K 9/00771* (2013.01); *G06K 9/3208* (2013.01); *G06K 9/3258* (2013.01); *G06T 7/74* (2017.01); G06K 2209/15 (2013.01); G06T 2207/10024 (2013.01); G06T 2207/30168 (2013.01); G06T 2207/30201 (2013.01); G06T 2207/30252 (2013.01)

(58) Field of Classification Search
CPC ............. G06K 9/00255; G06K 9/3208; G06K 9/3258; G06K 9/036; G06T 2207/10024; G06T 2207/30168; G06T 2207/30201; G06T 2207/30252; G06T 7/0002; G06T 7/74; G06T 2207/30144; G06T 7/001; G06T 7/80; H04N 1/00045
See application file for complete search history.

(56) References Cited

U.S. PATENT DOCUMENTS

| | | | | |
|---|---|---|---|---|
| 5,482,048 A | * | 1/1996 | Johnson | G06K 9/00268 382/128 |
| 5,960,125 A | * | 9/1999 | Michael | G06T 7/80 382/151 |
| 6,275,600 B1 | * | 8/2001 | Banker | G06K 15/00 358/406 |

(Continued)

*Primary Examiner* — Bhavesh M Mehta
*Assistant Examiner* — Ian L Lemieux
(74) *Attorney, Agent, or Firm* — Min-Lee Teng; Litron Patent & Trademark Office (57) ABSTRACT

The present invention discloses a method of evaluating image quality taken in an actual scene, the method comprising: providing a test chart placed in an actual scene, said test chart comprising a plurality of positioning patterns and a plurality of quality test patterns; capturing an image of the test chart in the actual scene; searching the plurality of positioning patterns in the image of the test chart to locate the orientation of the image of the test chart; and identifying the plurality of quality test patterns in the located image of the test chart and evaluating the image quality of the plurality of quality test patterns.

16 Claims, 7 Drawing Sheets

(56) References Cited

U.S. PATENT DOCUMENTS

| | | | | |
|---|---|---|---|---|
| 6,522,430 B1* | 2/2003 | Dalal | H04N 1/00002 | 358/406 |
| 6,587,591 B1* | 7/2003 | Matsui | G06K 5/00 | 382/181 |
| 6,992,696 B1* | 1/2006 | Albertelli | H04N 1/00002 | 348/188 |
| 7,419,230 B2* | 9/2008 | Tatsuta | B41J 2/2135 | 347/104 |
| 8,139,117 B2* | 3/2012 | Dwinell | G06T 7/001 | 348/135 |
| 8,345,315 B2* | 1/2013 | Sagan | H04N 1/32154 | 358/3.28 |
| 8,780,210 B1* | 7/2014 | Steinberg | H04N 17/004 | 348/187 |
| 8,939,540 B2* | 1/2015 | Fletcher | B41J 29/393 | 347/19 |
| 9,232,215 B1* | 1/2016 | Watson | H04N 17/004 | |
| 2005/0089246 A1* | 4/2005 | Luo | G06K 9/00268 | 382/286 |
| 2005/0261551 A1* | 11/2005 | Couvillon, Jr. | A61B 1/00059 | 600/118 |
| 2007/0002143 A1* | 1/2007 | Elberbaum | H04N 17/002 | 348/188 |
| 2008/0019611 A1* | 1/2008 | Larkin | G06K 9/6203 | 382/287 |
| 2008/0062266 A1* | 3/2008 | Chang | H04N 17/002 | 348/188 |
| 2008/0292131 A1* | 11/2008 | Takemoto | H04N 13/246 | 382/100 |
| 2011/0007371 A1* | 1/2011 | Yip | B41J 2/2135 | 358/504 |
| 2013/0016876 A1* | 1/2013 | Wooley | G06F 3/011 | 382/103 |
| 2013/0201532 A1* | 8/2013 | Takemoto | H04N 1/00015 | 358/406 |
| 2014/0211022 A1* | 7/2014 | Koh | H04N 17/002 | 348/188 |
| 2015/0049921 A1* | 2/2015 | Crean | G06K 9/036 | 382/112 |
| 2016/0080737 A1* | 3/2016 | Tezaur | G06T 7/80 | 348/188 |
| 2016/0094841 A1* | 3/2016 | Wang | H04N 17/002 | 348/44 |
| 2016/0140719 A1* | 5/2016 | Lucey | G06T 7/62 | 382/154 |
| 2016/0328626 A1* | 11/2016 | Pinkus | G06K 9/3208 | |
| 2017/0287166 A1* | 10/2017 | Claveau | G06T 7/80 | |

* cited by examiner

METHOD OF EVALUATING THE QUALITY OF IMAGES

CROSS-REFERENCE TO RELATED APPLICATION

This application claims the Priority of Taiwan application No. 106135635 filed Oct. 18, 2017, the disclosure of which is incorporated herein in its entirety by reference.

BACKGROUND OF THE INVENTION

1. Field of the Invention

The present invention relates to a method for evaluating the quality of an image, and more particularly, to a method for evaluating the quality of an image taken from an actual scene.

2. Description of the Prior Art

In recent years, with the increase of the number of surveillance cameras, the applications of image analysis have also increased rapidly, such as face recognition, license plate recognition, abnormal behavior analysis, etc. However, the image viewing angle and image quality required for each image analysis may vary, and a high level of professionalism is required when evaluating the quality of an image taken from an actual scene. For example, face recognition requires a minimum face size to meet the demand, and license plate recognition requires a minimum size of characters on the license plate to meet the demand. In addition, when capturing an image of a license plate on a moving vehicle, the shutter speed needs to be set faster so as to prevent the image of the license plate from being blurred as the vehicle moves at a high speed. For those people who do not have sufficient tools or knowledge cannot verify whether an image taken from an actual scene meets the requirements for subsequent image analysis. Conventional way of evaluating the image quality is mainly used for adjusting the hardware of a camera, especially for adjusting the hardware of a camera in a factory before it is sold, and therefore the conventional way of evaluating the quality of an image is not suitable for evaluating the quality of an image taken from an actual scene.

Accordingly, a new method is needed for evaluating the quality of an image taken from an actual scene.

SUMMARY OF THE INVENTION

The method of the present invention for evaluating the quality of an image taken from an actual scene comprising providing a test chart comprising a plurality of positioning patterns and a plurality of quality test patterns, wherein when the test chart is place in an actual scene and an image the test chart is captured by a camera, the positioning patterns of the test chart can be searched to locate the orientation of the image of the test chart, and then image quality analysis can be performed on the quality test patterns which are identified after the orientation of the image of the test chart is located. Compared with the conventional techniques, the method of the present invention can automatically calculate the image quality of different quality test patterns without manually marking the orientation of the test chart and the positions of the quality test patterns of the test chart.

A face or a license plate image captured in different environments may have different image qualities. The present invention can automatically locate the orientation of the image of the test charts captured in different actual scenes. After locating the orientation of the test chart, image quality analysis can be performed on a variety of different quality test patterns as present in the image of the test chart for subsequent adjustment of the relative position of the test chart and the camera until the image quality of the test chart meet the requirements for image analysis of subsequent images taken from the actual scene. Once the test chart meet the requirements, subsequent images of faces or license plates captured in the actual scene can then be analyzed.

In one embodiment of the present invention, a method for evaluating the quality of an image taken from an actual scene is provided. The method comprising: provides a test chart placed in the actual scene, wherein the test chart includes a plurality of positioning patterns and a plurality of quality test patterns; capturing the image of the test chart in the actual scene; searching the plurality of positioning patterns in the image of the test chart to locate the orientation of the image of the test chart; and then identifying the plurality of quality test patterns in the image of the test chart and evaluating the quality of the images of the plurality of quality test patterns.

In one embodiment, each of three corners of the test chart has a corresponding positioning pattern, wherein a vertical resolution quality test pattern formed by horizontal stripes is placed between a first positioning pattern on the upper left corner of the test chart and a second positioning pattern on the upper right corner of the test chart; and a horizontal resolution quality test pattern formed by vertical stripes is placed between the first positioning pattern on the upper left corner of the test chart and a third positioning pattern on the lower left corner of the test chart.

In one embodiment, the test chart further includes a contrast quality test pattern and a motion blur quality test pattern.

In one embodiment, the test chart includes a face for assessing the size and the image quality of the face.

In one embodiment, the face in the test chart comprises a plurality of grayscale patterns comprising a plurality of grayscale values for evaluating the image quality of the face image.

In one embodiment, the image of the test chart includes a license plate for assessing the size of license plate and the sizes of the characters on the license plate.

In one embodiment, the license plate comprises a plurality of grayscale patterns comprising a plurality of grayscale values for evaluating the image quality of the license plate.

In one embodiment, the method further includes performing image processing such as color graying, image enhancement, and image binarization on the image of the test chart so as to make the image suitable for subsequent processing.

In one embodiment, the method includes displaying at least one prompt on a screen for allowing a user to adjust the position of the test chart such that the image quality of the plurality of quality test patterns meet the requirements.

In one embodiment of the present invention, a test chart for evaluating the quality of an image is provided. The test chart includes a plurality of positioning patterns for locating the orientation of the test chart and a plurality of quality test patterns for evaluating the image quality of the test chart. In one embodiment, each of three corners of the test chart has a corresponding positioning pattern, wherein a vertical resolution quality test pattern formed by horizontal stripes is placed between a first positioning pattern on the upper left corner of the test chart and a second positioning pattern on the upper right corner of the test chart, and a horizontal resolution quality test pattern formed by vertical stripes is placed between the first positioning pattern on the upper left corner of the test chart and a third positioning pattern on the lower left corner of the test chart.

In one embodiment, the test chart further includes a contrast quality test pattern and a motion blur quality test pattern.

In one embodiment, the test chart includes a face for assessing the size and the image quality of the face.

In one embodiment, the face in the test chart comprises a plurality of grayscale patterns comprising a plurality of grayscale values for evaluating the image quality of the face.

In one embodiment, the image of the test chart includes a license plate for assessing the sizes of the license plate, the character size on the license plate and the image quality of the license plate.

In one embodiment, the license plate in the test chart comprises a plurality of grayscale patterns comprising a plurality of grayscale values for evaluating the image quality of the character on the license plate.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

The foregoing and other technical aspects, features, and effects of the present invention will become more apparent from the following detailed description of the preferred embodiments when taken in conjunction with the accompanying drawings. However, it should be noted that the following embodiments are not intended to limit the present invention.

Figure 1:
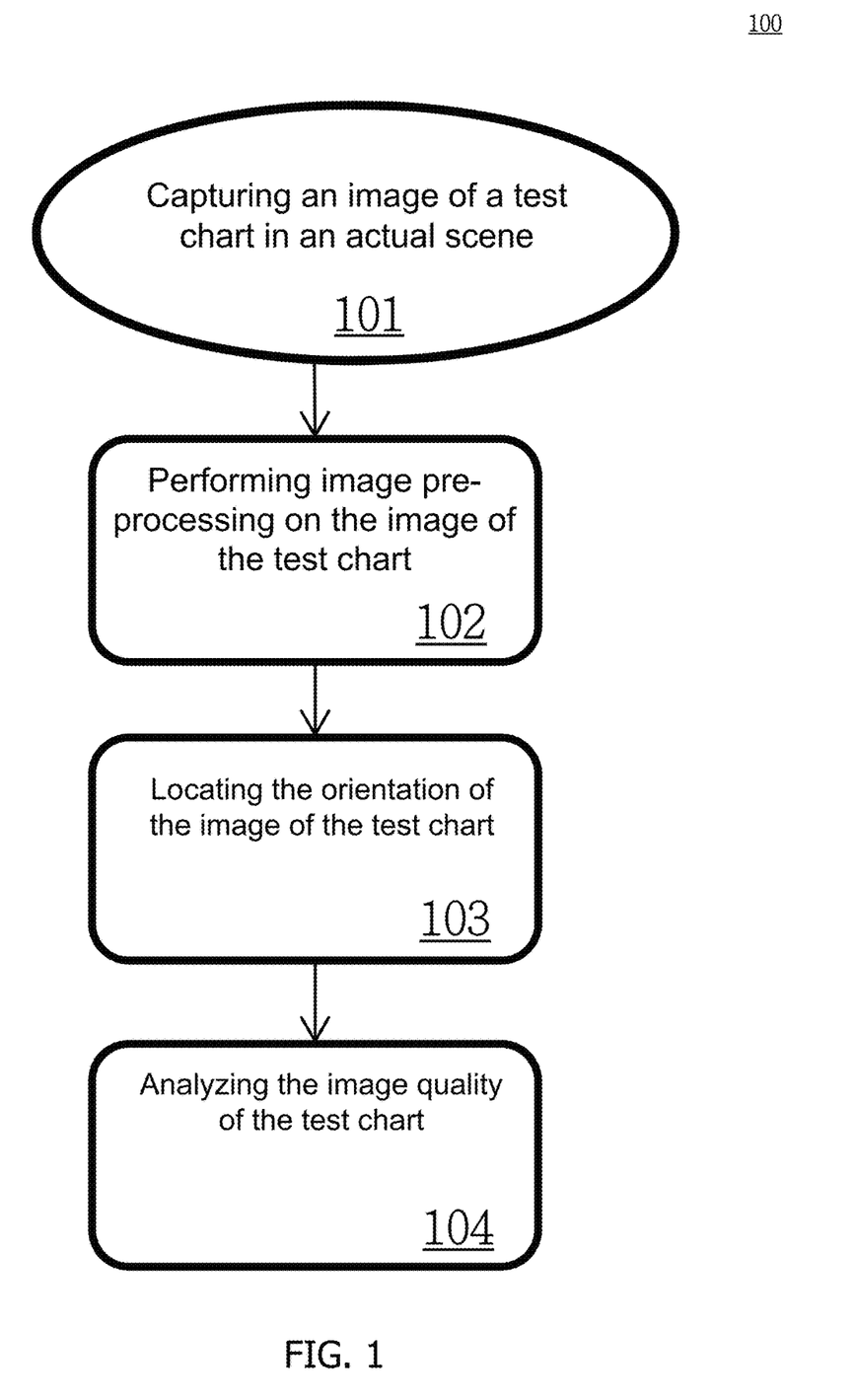
FIG. 1 illustrating a flowchart of a method for evaluating the quality of an image according to one embodiment of the present invention.

In one embodiment, a method for evaluating the quality of an image taken from an actual scene for specific image analysis is disclosed. FIG. 1 illustrates a method for evaluating the quality of an image for specific image analysis according to one embodiment of the present invention.

Please refer to FIG. 1. In step 101, an image of a test chart in an actual scene is captured by a camera. In step 102, image pre-processing can be performed on the image of the test chart, such as color graying, image enhancement, and image binarization, so as to make the image suitable for subsequent processing. Please refer to FIG. 1 and FIG. 6A. In step 103, the orientation of the image of the test chart is located by searching the positioning patterns 601, 602, 603 in FIG. 6A. When the number of the positioning patterns and the relative positions thereof in the image of the test chart conforms to the positioning patterns defined in the original test chart, the orientation of the image of the test chart can be automatically located without manual marking. In addition, the distance between the positioning patterns 601, 602, and 603 can also be used to check whether the size of the image of the test chart is larger or smaller than that of the original test chart. After the orientation of the image of the test chart is located in step 104, each of the quality test patterns in the image of the test chart can be automatically identified for analyzing the image quality, wherein the quality test patterns can include resolution test patterns, a standard-sized face or a standard-sized license plate, contrast quality test patterns and motion blur quality test patterns for assessing all aspects of the image quality of the test chart.

Figure 2:
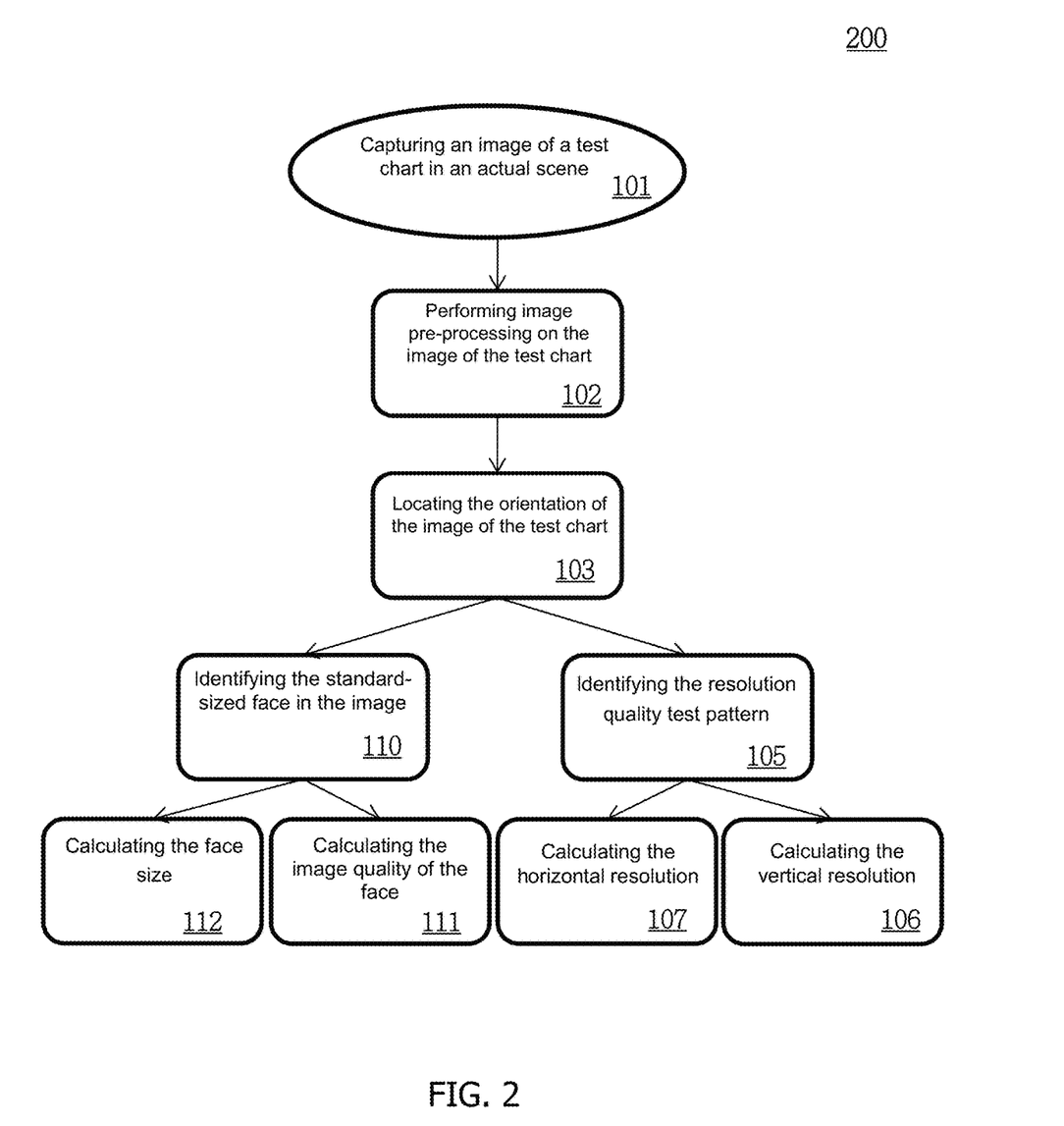
FIG. 2 illustrates a flowchart of the method for evaluating the quality of an image of a human face according to one embodiment of the present invention.

FIG. 2 illustrates a flowchart of the method for evaluating the quality of an image of a human face according to one embodiment of the present invention. Please refer to FIG. 2 and FIG. 6A. In this embodiment of the present invention, the method for evaluating the quality of an image proposed in the present invention can be used to tell whether the image quality and the resolution quality meets the requirements for face recognition. The resolution quality test pattern is identified in step 105 after the steps 101, 102 and 103 shown in FIG. 1. Please refer to FIG. 6A in which each of three corners of the test chart has a positioning pattern 601, 602, 603 for locating the orientation of the image of the test chart. The vertical resolution is calculated for the vertical resolution quality test pattern 604 in step 106. Please refer to FIG. 6A, the vertical resolution quality test pattern 604 formed by horizontal stripes is placed between two positioning patterns 601, 602 on the upper left corner and the upper right corner of the test chart for calculating the vertical resolution. The horizontal resolution is calculated for the horizontal resolution quality test pattern 605 in step 107. Please refer to FIG. 6A. A horizontal resolution quality test pattern 605 formed by vertical stripes is placed between two positioning patterns 601, 603 on the upper left corner and lower left corner of the test chart for calculating the horizontal resolution. The vertical resolution quality test pattern 604 and the horizontal resolution quality test pattern 605 are used to evaluate the effective resolution in a specific direction. The standard-sized face image is identified in step 110, including calculating the image quality of the face in step 111 and calculating the face size in step 112. Please refer to FIG. 6A. The center of the test chart is a standard-sized face 606 for assessing whether the size of the face meets the requirements. The image quality of the face can also be obtained.

Figure 3:
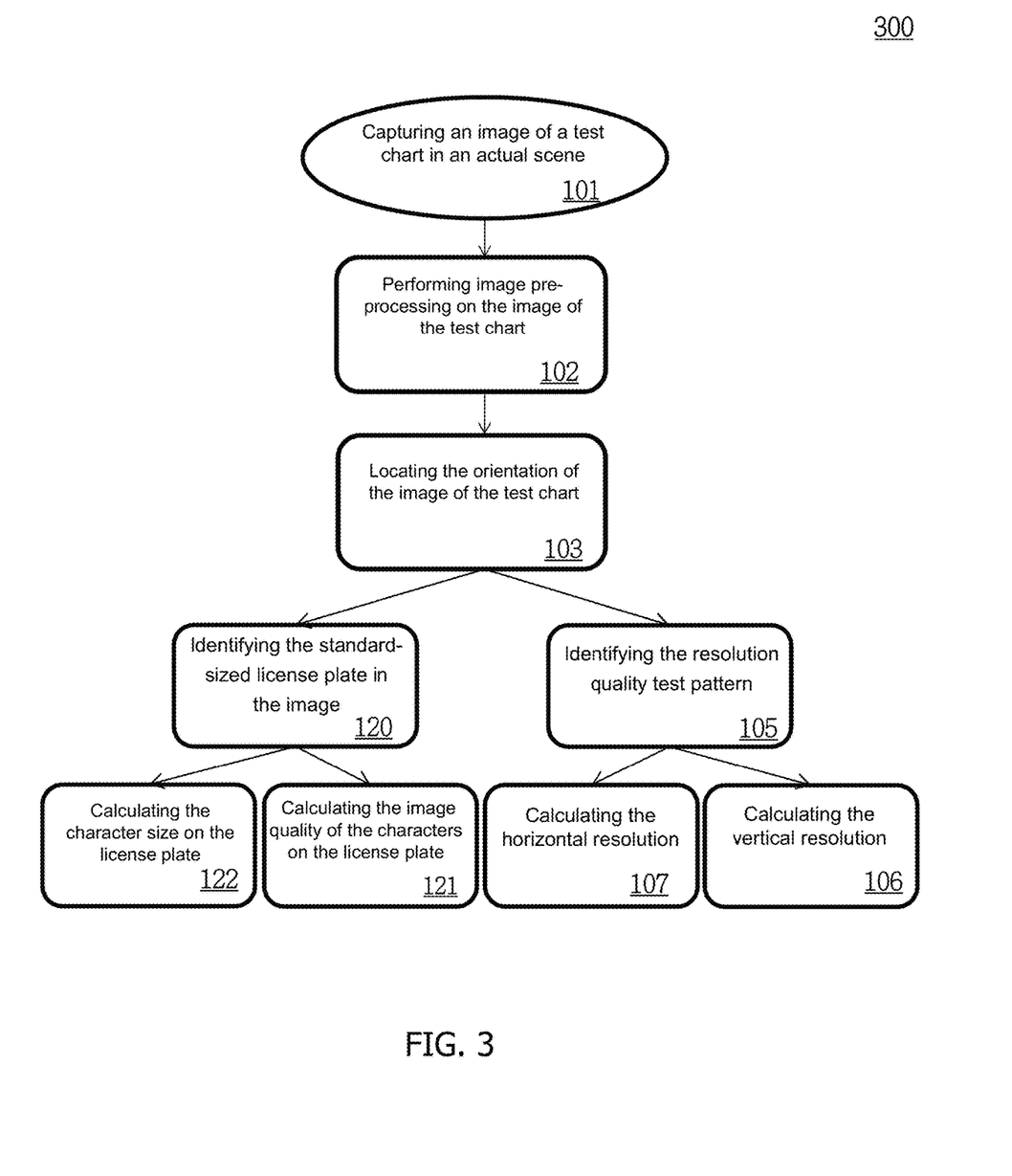
FIG. 3 illustrates a flowchart of the method for evaluating the quality of an image of a license plate according to one embodiment of the present invention.

In the present embodiment, the method for evaluating the quality of an image proposed in the present invention can be used to tell whether the image quality and the resolution quality meets the requirements for license plate recognition. The resolution quality test pattern is identified in step 105 after the steps 101, 102 and 103 shown in FIG. 1. Please refer to FIG. 6B in which a positioning pattern 601, 602, 603 is respectively placed in each of three corners of the test chart for locating the orientation of the image of the test chart. The vertical resolution is calculated for the vertical resolution quality test pattern 604 in step 106. Please refer to FIG. 6B. A vertical resolution vertical quality test pattern 604 formed by horizontal stripes is placed between two positioning patterns 601, 602 on the upper left corner and the upper right corner of the test chart for calculating the vertical resolution. The horizontal resolution is calculated for the horizontal resolution quality test pattern 605 in step 107. Please refer to FIG. 6B. A horizontal resolution quality test pattern 605 formed by vertical stripes is placed between two positioning patterns 601, 603 on the upper left corner and lower left corner of the test chart for calculating the horizontal resolution. The vertical resolution quality test pattern 604 and the horizontal resolution quality test pattern 605 are used to evaluate the effective resolution in a specific direction. The standard-sized license plate image is identified in step 120, including calculating the image quality of the characters on the license plate in step 121 and calculating the character size on the license plate in step 122. Please refer to FIG. 6B. The center of the test chart is a standard-sized license plate 610 for assessing whether the character size on the license plate meets the requirements, and the image quality of the characters on the license plate can also be obtained.

Figure 4:
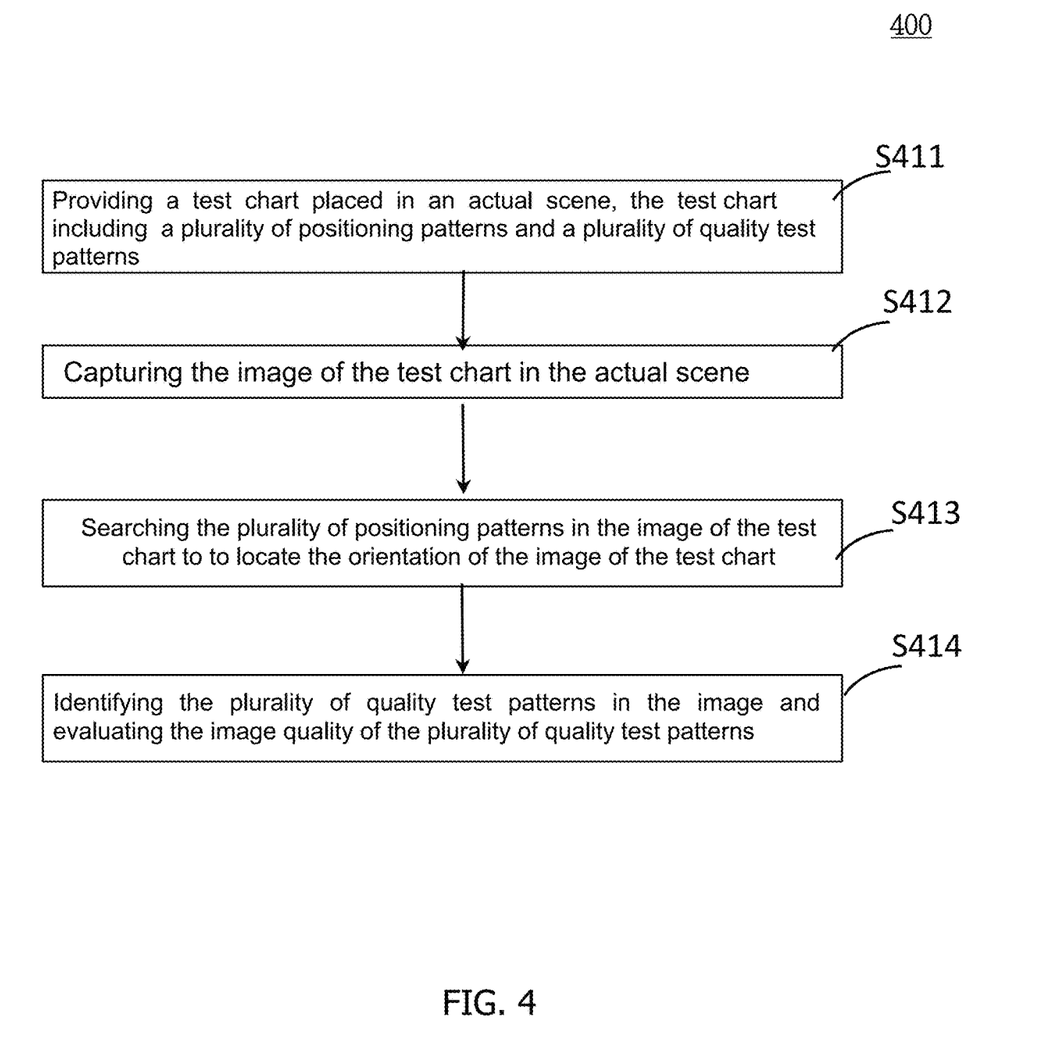
FIG. 4 illustrates a flowchart of the method for evaluating the quality of an image taken from an actual scene according to one embodiment of the present invention.

FIG. 4 is a flowchart illustrating a method for evaluating the quality of an image taken from an actual scene according to one embodiment of the present invention. Please refer to FIG. 4. The method of evaluating the quality of an image taken from an actual scene includes the following steps. In step S411, a test chart is provided and placed in the actual scene, the test chart including a plurality of positioning patterns and a plurality of quality test patterns. In step S412, the image of the test chart is captured in the actual scene. In step S413, the plurality of positioning patterns in the image of the test chart are found to locate the orientation of the image of the test chart. In step S414, the images of the plurality of quality test patterns are identified and the image quality of the plurality of quality test patterns is evaluated.

Figure 6A:
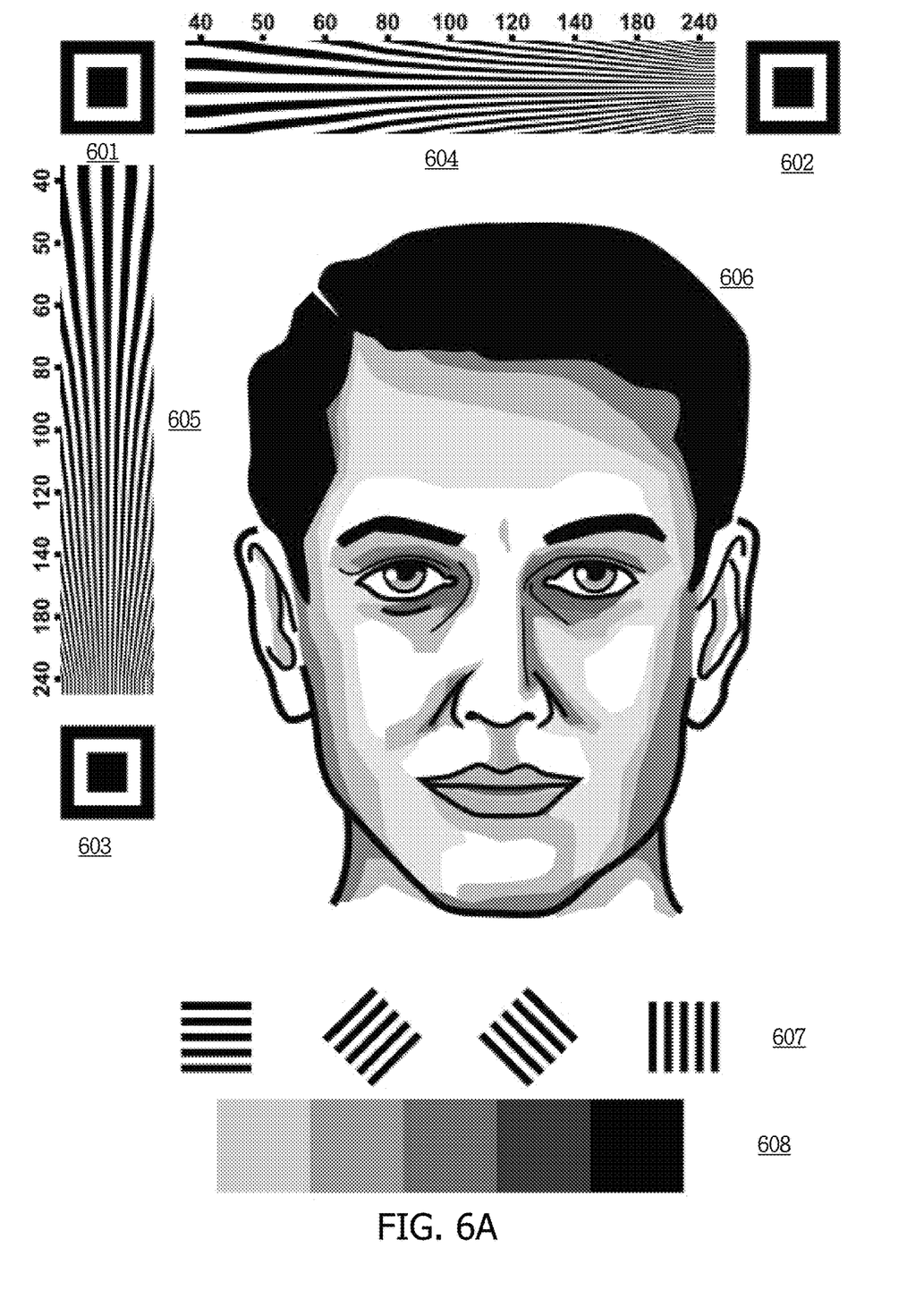
FIG. 6A is a schematic diagram illustrating a test chart for evaluating the image quality of a face according to one embodiment of the present invention.

Please refer to FIG. 6A. In one embodiment, positioning patterns 601, 602, 603 are placed in three corners of the test chart, wherein a vertical resolution quality test pattern 604 formed by horizontal stripes is placed between the positioning patterns 601, 602 on the upper left corner and the upper right corner of the test chart, and a horizontal resolution quality test pattern 605 formed by vertical stripes is placed between the positioning patterns 601, 603 on the upper left corner and the lower left corner of the test chart. In addition, the distance between the positioning patterns 601, 602, 603 can also be used to tell whether the size of the image of the test chart is larger or smaller than that of the original test chart.

Please refer to FIG. 6A. In one embodiment, the test chart further includes a motion blur quality test pattern 607 and a contrast quality test pattern 608.

Please refer to FIG. 6A. In one embodiment, the test chart further includes a face 606 for assessing the size of the face and the image quality of the face.

Please refer to FIG. 6A. In one embodiment, the face comprises a plurality of grayscale patterns comprising a plurality of grayscale values for evaluating the image quality of the face image.

Figure 6B:
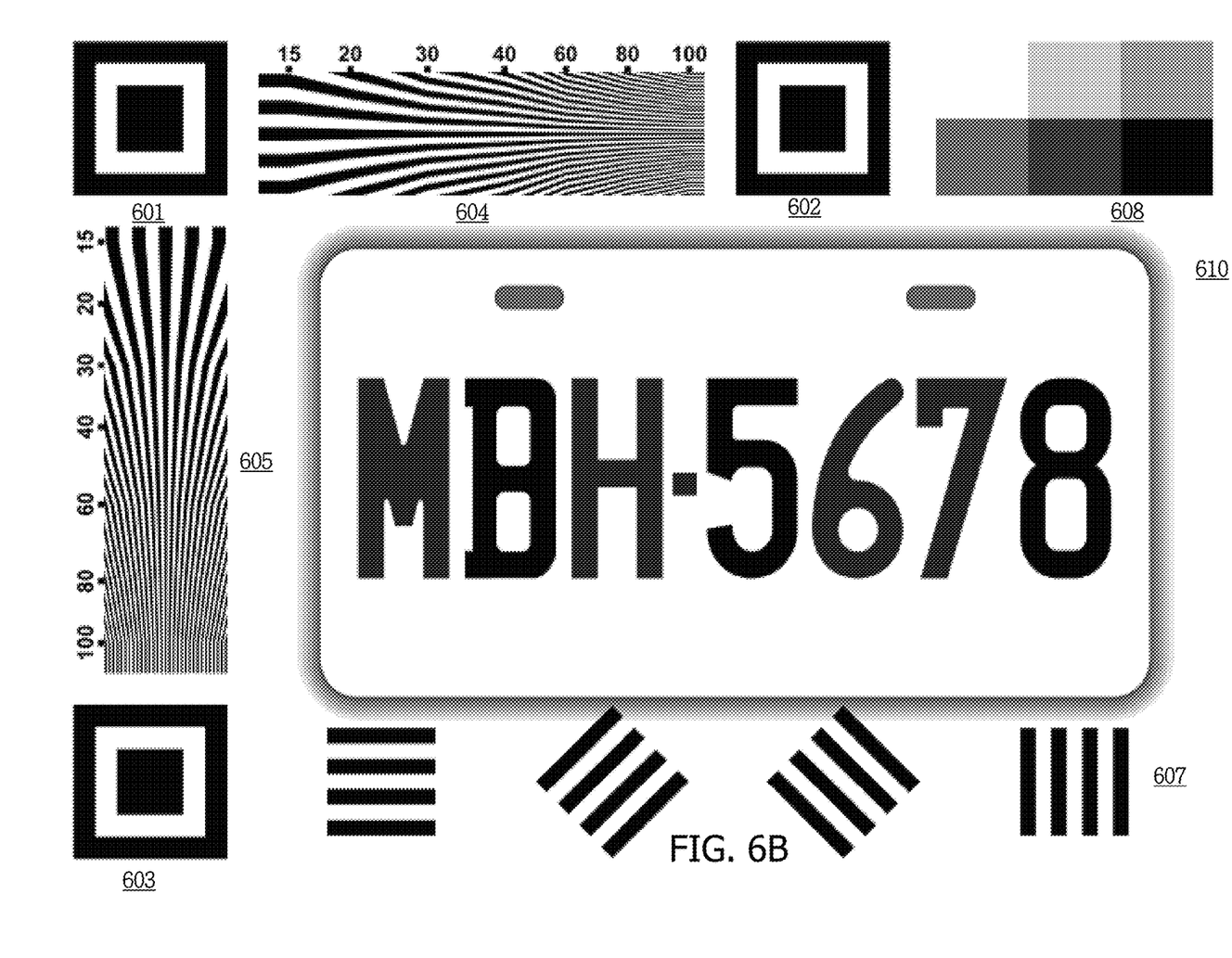
FIG. 6B is a schematic diagram illustrating a test chart for evaluating the image quality of a license plate according to one embodiment of the present invention.

Please refer to FIG. 6B. In one embodiment, the image of the test chart further includes a license plate for assessing the size of the license plate, the character size on the license plate and the image quality of the license plate.

Please refer to FIG. 6B. In one embodiment, the license plate comprises a plurality of grayscale patterns comprising a plurality of grayscale values for evaluating the image quality of characters on the license plate.

In one embodiment, the method further includes performing image processing such as color graying, image enhancement, and image binarization on the image of the test chart so as to make the image suitable for subsequent processing.

In one embodiment, the method further includes displaying at least one prompt on a screen for adjusting the position of the test chart such that the plurality of quality test patterns meet the requirements.

Figure 5:
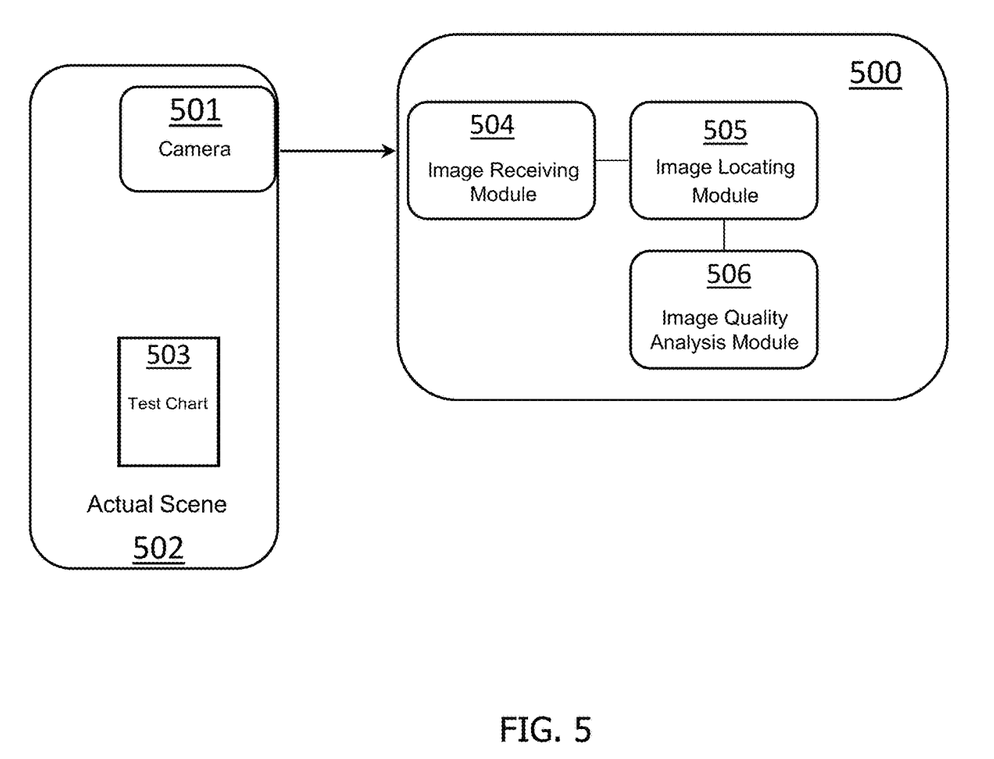
FIG. 5 is a schematic diagram illustrating a system for evaluating the quality of an image taken from an actual scene according to one embodiment of the present invention.

FIG. 5 is a schematic diagram illustrating a system 500 for evaluating the quality of images taken from an actual scene according to one embodiment of the present invention. Please refer to FIG. 5. A system 500 for evaluating the quality of an image taken from an actual scene comprises an image receiving module 504 to receive an image of a test chart 503 placed in an actual scene 502, wherein the image of the test chart 503 is captured by a camera 501, and the test chart comprises a plurality of positioning patterns and a plurality of quality test patterns; an image locating module 505 configured to search the plurality of positioning patterns in the image of the test chart so as to locate the orientation of the image of the test chart; and an image quality analysis module 506 used for identifying the plurality of quality test patterns in the image of the test chart and evaluating the image quality of the plurality of quality test patterns.

In one embodiment, each of the three corners of the test chart has a positioning pattern, wherein the vertical resolution quality test pattern formed by horizontal stripes is placed between two positioning patterns on the upper left corner and the upper right corner of the test chart, and the horizontal resolution quality test pattern formed by vertical stripes is placed between two positioning patterns on the upper left corner and the lower left corner of the test chart.

In one embodiment, the test chart further includes a contrast quality test pattern and a motion blur quality test pattern.

In one embodiment, the test chart further includes a face for assessing the size of the face and the image quality of the face.

In one embodiment, the face comprises a plurality of grayscale patterns comprising a plurality of grayscale values for evaluating the image quality of the face image.

In one embodiment, the image of the test chart includes a license plate for assessing the size of the license plate and the image quality of the characters on the license plate.

In one embodiment, the license plate comprises a plurality of grayscale patterns comprising a plurality of grayscale values for evaluating the image quality of the license plate.

In one embodiment, the method further includes performing image processing such as color graying, image enhancement, and image binarization on the image of the test chart so as to make the image suitable for subsequent processing.

In one embodiment, the method further includes displaying at least one prompt on a screen for adjusting the position of the test chart such that the plurality of quality test patterns meet the requirements for image quality.

FIG. 6A is a schematic diagram illustrating a test chart for evaluating image quality according to one embodiment of the present invention. Please refer to FIG. 6A. The test chart comprises a plurality of positioning patterns 601, 602, 603, and a plurality of quality test patterns, wherein each of the three corners of the test chart has a positioning pattern 601, 602, 603, a vertical resolution quality test pattern 604 formed by horizontal stripes is placed between two positioning patterns 601, 602 on the upper left corner and the upper right corner of the test chart, and a horizontal resolution quality test pattern 605 formed by vertical stripes is placed between two positioning patterns 601, 603 on the upper left corner and the lower left corner of the test chart. In addition, the distance between the positioning patterns 601, 602, 603 can also be used to tell whether the size of the image of the test chart is larger or smaller than that of the original test chart. Vertical resolution quality test pattern 604 and horizontal resolution quality test pattern 605 are used to evaluate the effective resolution in a specific direction. The center of the test chart is a standard-sized face 606 used to assess whether the size of the face meets the requirement and to acquire the image quality of the face. In addition, the distance between the positioning patterns 601, 602, 603 can also be used to tell whether the size of the image of the test chart is larger or smaller than that of the original test chart. In one embodiment, the test chart further includes a motion blur quality test pattern 607 and a contrast quality test pattern 608. In one embodiment, the face 606 comprises a plurality of grayscale patterns comprising a plurality of grayscale values for evaluating the image quality of the face image.

FIG. 6B is a schematic diagram illustrating a test chart for evaluating the quality of an image according to one embodiment of the present invention. Please refer to FIG. 6B. The test chart comprises a plurality of positioning patterns 601, 602, 603, and a plurality of quality test patterns, wherein each of the three corners of the test chart has a positioning pattern, 601, 602, 603, wherein a vertical resolution quality test pattern 604 formed by horizontal stripes is placed between two positioning patterns 601, 602 on the upper left corner and the upper right corner of the test chart, and a horizontal resolution quality test pattern 605 formed by vertical stripes is placed between two positioning patterns 601, 603 on the upper left corner and the lower left corner of the test chart. In addition, the distance between the positioning patterns 601, 602, and 603 can also be used to tell whether the size of the image of the test chart is larger or smaller than that of the original test chart. The vertical resolution quality test pattern 604 and the horizontal resolution quality test pattern 605 are used to evaluate the effective resolution in a specific direction. The center of the test chart is a standard-sized license plate 610, which is used to assess whether the character size of the license plate meets the requirement and the image quality of characters on license plate can also be obtained. In one embodiment, the test chart further includes a motion blur quality test pattern 607 and a contrast quality test pattern 608. In one embodiment, the license plate 610 comprises a plurality of grayscale patterns comprising a plurality of grayscale values for evaluating the image quality of the license plate image.

As described above, the present invention provides a method for evaluating the quality of an image taken from an actual scene by placing a test chart comprising a plurality of positioning patterns and a plurality of quality test patterns in an actual scene. The orientation of the test chart can be located by the positioning patterns. Image quality analysis can be performed for a variety of different quality test patterns after the orientation of the image of the test chart is located. Compared with the conventional techniques, the method is capable of automatically calculating the quality scores of different quality test patterns in an image of a test chart without manually marking the orientation of the image of the test chart and the positions of different quality test patterns in the image of the test chart.

Face or license plate images captured in different scenes will have different image quality. The present invention can automatically locate the orientation of the image of the test chart in different actual scenes. Image quality analysis for a variety of different quality test patterns can be performed after the orientation of the image of the test chart is located, such that subsequent adjustments of the relative positions of the test charts and the camera can be made until the image quality of the quality test patterns meets the requirements. After the image quality of the quality test patterns meets the requirements, subsequent images such as face or license plate image captured in the actual scene can then be analyzed.

What is claimed is:

1. A method of evaluating image quality, comprising:
providing a test chart placed in an actual scene, said test chart comprising a plurality of positioning patterns and a plurality of quality test patterns, wherein the test chart further comprises a face for assessing the size of the face and the image quality of the face;
capturing an image of the test chart in the actual scene;
searching the plurality of positioning patterns in the image of the test chart to locate the orientation of the image of the test chart; and
identifying the plurality of quality test patterns in the located image of the test chart and evaluating the image quality of the plurality of quality test patterns.

2. The method according to claim 1, wherein each of three corners of the test chart has a corresponding positioning pattern, wherein a vertical resolution quality test pattern formed by horizontal stripes is placed between a first positioning pattern on the upper left corner of the test chart and a second positioning pattern on the upper right corner of the test chart; and a horizontal resolution quality test pattern formed by vertical stripes is placed between the first positioning pattern on the upper left corner of the test chart and a third positioning pattern on the lower left corner of the test chart.

3. The method according to claim 1, wherein the test chart further comprises a contrast quality test pattern and a motion blur quality test pattern.

4. The method according to claim 1, wherein the face comprises a plurality of grayscale patterns comprising a plurality of grayscale values for evaluating the image quality of the face presented in the image of the test chart.

5. The method according to claim 1, further comprising performing color graying, image enhancement and image binarization on the image of the test chart so as to make the image of the test chart suitable for subsequent processing.

6. The method according to claim 1, further comprising displaying at least one prompt on a screen for adjusting the relative position between the test chart and a camera.

7. A test chart for evaluating image quality, said test chart comprising:
a plurality of positioning patterns for locating the orientation of an image of the test chart, wherein the test chart further includes a face for assessing the size and the image quality of the face; and
a plurality of quality test patterns for evaluating the quality of the image of the test chart.

8. The test chart according to claim 7, wherein each of three corners of the test chart has a corresponding positioning pattern, wherein a vertical resolution quality test pattern formed by horizontal stripes is placed between a first positioning pattern on the upper left corner of the test chart and a second positioning pattern on the upper right corner of the test chart; and a horizontal resolution quality test pattern formed by vertical stripes is placed between the first positioning pattern on the upper left corner of the test chart and a third positioning pattern on the lower left corner of the test chart.

9. The test chart according to claim 7, wherein the face comprises a plurality of grayscale patterns comprising a plurality of grayscale values for evaluating the image quality of the face.

10. A method of evaluating image quality, comprising:
providing a test chart placed in an actual scene, said test chart comprising a plurality of positioning patterns and a plurality of quality test patterns, wherein the image of the test chart further comprises a license plate for assessing the size of the license plate and the image quality of the license plate;
capturing an image of the test chart in the actual scene;
searching the plurality of positioning patterns in the image of the test chart to locate the orientation of the image of the test chart; and
identifying the plurality of quality test patterns in the located image of the test chart and evaluating the image quality of the plurality of quality test patterns.

11. The method according to claim 10, wherein the license plate comprises a plurality of grayscale patterns comprising a plurality of grayscale values for evaluating the image quality of the license plate presented in the image of the test chart.

12. The method according to claim 10, further comprising performing color graying, image enhancement and image binarization on the image of the test chart so as to make the image of the test chart suitable for subsequent processing.

13. The method according to claim 10, further comprising displaying at least one prompt on a screen for adjusting the relative position between the test chart and a camera.

14. A test chart for evaluating image quality, said test chart comprising:
a plurality of positioning patterns for locating the orientation of an image of the test chart, wherein the image of the test chart further comprises a license plate for assessing the size of the license plate and the image quality of the license plate; and
a plurality of quality test patterns for evaluating the quality of the image of the test chart.

15. The test chart according to claim 14, wherein the license plate comprises a plurality of grayscale patterns comprising a plurality of grayscale values for evaluating the image quality of the license plate presented in the image of the test chart.

16. The test chart according to claim 14, wherein each of three corners of the test chart has a corresponding positioning pattern, wherein a vertical resolution quality test pattern formed by horizontal stripes is placed between a first positioning pattern on the upper left corner of the test chart and a second positioning pattern on the upper right corner of the test chart; and a horizontal resolution quality test pattern formed by vertical stripes is placed between the first positioning pattern on the upper left corner of the test chart and a third positioning pattern on the lower left corner of the test chart.

* * * * *